(12) United States Patent
Yang et al.

(10) Patent No.: US 8,253,595 B2
(45) Date of Patent: Aug. 28, 2012

(54) PORTABLE ELECTRONIC DEVICE WITH PROTECTIVE COVER FOR KEYPAD

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 480 days.

(21) Appl. No.: 12/648,278

(22) Filed: Dec. 28, 2009

(65) Prior Publication Data

US 2010/0271242 A1 Oct. 28, 2010

(30) Foreign Application Priority Data

Apr. 24, 2009 (CN) .......................... 2009 1 0301814

(51) Int. Cl.
*H03M 1/00* (2006.01)
*B65D 45/20* (2006.01)
(52) U.S. Cl. .................. 341/20; 455/575.8; 206/320
(58) Field of Classification Search .................... 341/20; 455/575.1, 575.4, 575.8; 206/320; 220/4.21, 220/254.2, 254.9, 254.7, 254.1, 345.2, 345.4, 345.5

See application file for complete search history.

(56) References Cited

U.S. PATENT DOCUMENTS

| 7,072,699 | B2 * | 7/2006 | Eiden .......................... 455/575.8 |
| 7,464,814 | B2 * | 12/2008 | Carnevali ...................... 206/320 |
| 8,014,134 | B2 * | 9/2011 | Liu et al. .................. 361/679.01 |
| 2011/0319147 | A1 * | 12/2011 | Tages et al. ................ 455/575.8 |
| 2012/0037524 | A1 * | 2/2012 | Lonsdale et al. .............. 206/320 |

* cited by examiner

*Primary Examiner* — Howard Williams
(74) *Attorney, Agent, or Firm* — Altis Law Group, Inc.

(57) ABSTRACT

A portable electronic device includes a main body, a housing and a protective cover. The main body includes a keypad. The housing is attached to the main body. The housing defines a receiving space and two guiding grooves. The two guiding grooves are positioned at two opposite sides of the receiving space and communicating with the receiving space. The protective cover includes two rails respectively engaged in the two guiding grooves. The protective cover is slidable in the receiving space along the guiding grooves to cover or expose the keypad.

16 Claims, 4 Drawing Sheets

US 8,253,595 B2

PORTABLE ELECTRONIC DEVICE WITH PROTECTIVE COVER FOR KEYPAD

BACKGROUND

1. Technical Field

The present disclosure relates to portable electronic devices, particularly, to a portable electronic device with a protective keypad cover.

2. Description of Related Art

Portable electronic devices such as mobile phones, personal digital assistants, etc., are wildly used. A portable electronic device generally includes a keypad, a printed circuit board and a housing receiving the keypad and the printed circuit board. The keypad is electronically connected to the printed circuit board. The housing defines at least one through hole for allowing the keypad to extend through, so that the keypad can be used as an input terminal. However, water or dust may penetrate the housing from the at least one through hole, which may damage the printed circuit board.

Therefore, there is room for improvement within the art.

BRIEF DESCRIPTION OF THE DRAWINGS

Many aspects of portable electronic device can be better understood with reference to the following drawings. The components in the drawings are not necessarily drawn to scale, the emphasis instead being placed upon clearly illustrating the principles of the portable electronic device, in which.

DETAILED DESCRIPTION

Figure 1:
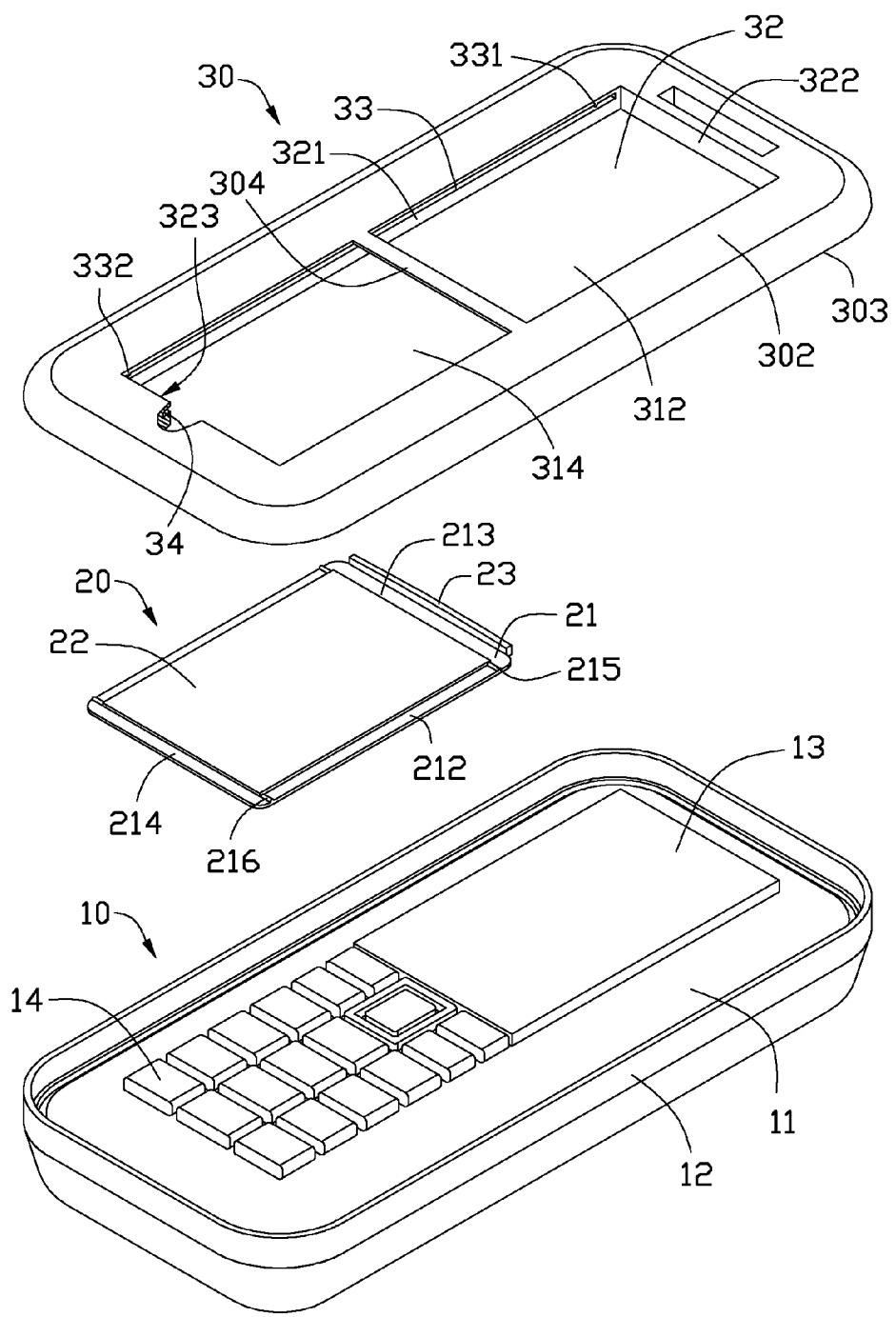
FIG. 1 is an exploded, isometric view of a portable electronic device with a protective cover, in accordance with an exemplary embodiment.

FIG. 1 shows an exemplary embodiment of a portable electronic device 100 including a main body 10, a protective cover 20, and a housing 30.

The main body 10 includes a panel 11 and a flange 12 surrounding the panel 11. A display 13 and a keypad 14 are positioned on the panel 11.

The protective cover 20 includes a base plate 21 and a covering plate 22 on the base plate 21. The covering plate 22 is smaller than the base plate 21 but is placed to cover most of the base plate 21, leaving edges of the base plate 21 exposed where two rails 212 and two end portions 213, 214 are formed at the edges thereof. A rib 23 is positioned on the end portion 213 for sliding the protective cover 20. A first protrusion 215 and a second protrusion 216 are respectively formed on each rail 212 at their two ends. In this exemplary embodiment, the protective cover 20 is made of transparent material.

The housing 30 includes an upper surface 302 and an opposite lower surface 303. The upper surface 302 defines a first opening 312, a second opening 314, and a bar 304 therebetween. The lower surface 303 defines a receiving space 32 to receive the keypad 14 and the display 13. Two openings 312, 314 communicate with the receiving space 32. The receiving space 32 is cooperatively defined by two side walls 321 and two end walls 322, 323. The size of the second opening 314 is similar to that of the covering plate 22 so that the second opening 314 can be sealed by the covering plate 22. The positions of the first opening 312 and the second opening 314 respectively correspond to that of the display 13 and the keypad 14. Each side wall 321 defines a guiding groove 33 for slidably receiving a given rail 212. When the protective cover 20 is attached to the housing 30, the rib 23 is raised from the upper surface 302 for convenient operation. The housing 30 includes a first projection 331 and a second projection 332 in each guiding groove 33. The projections 331, 332 are respectively positioned at two ends of the guiding groove 33. Each projection 331, 332 releasably latches with the protrusions 215, 216 of the protective cover 20. The end wall 323 defines a slot 34 for receiving the end portion 214 of the protective cover 20.

Figure 2:
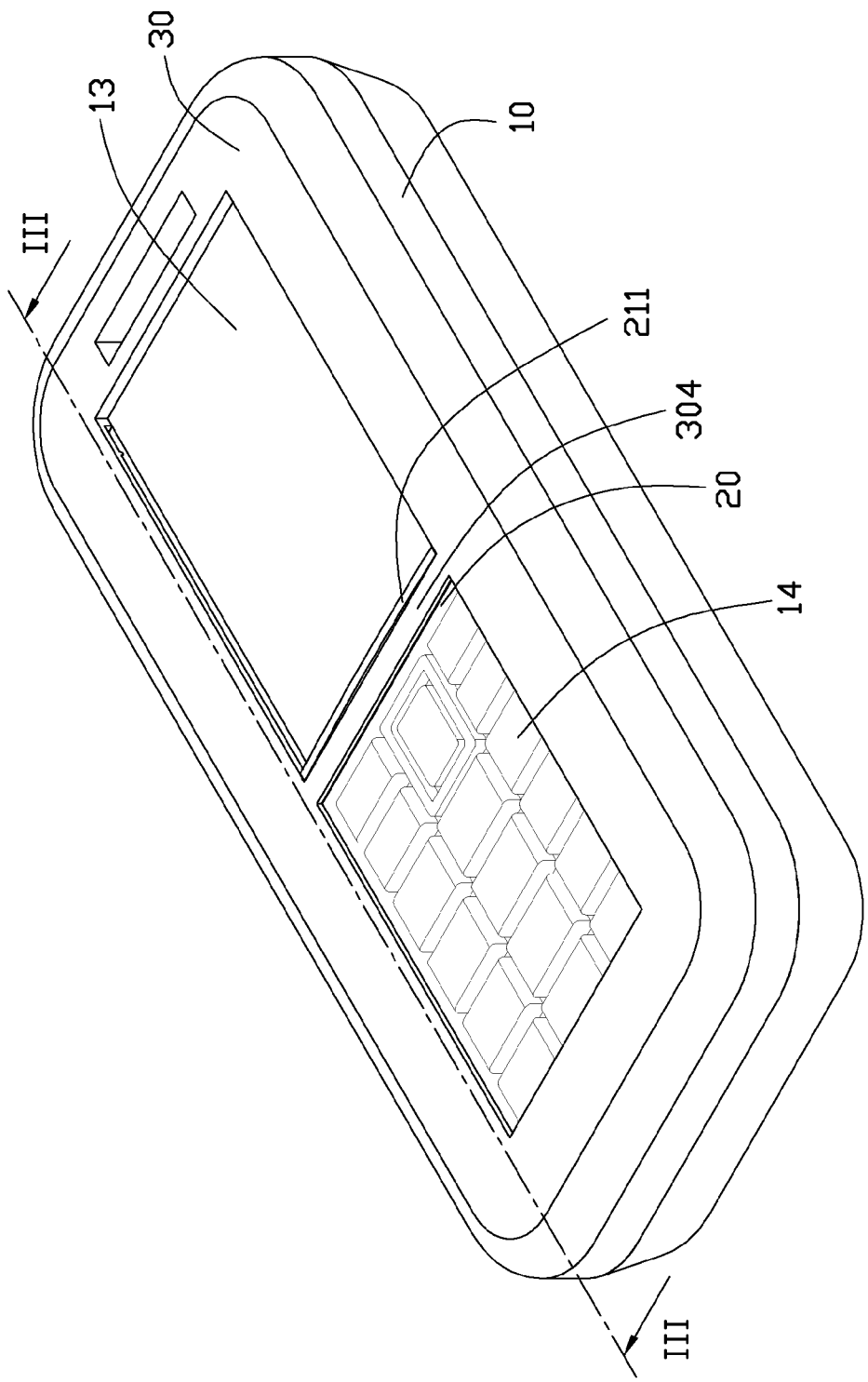
FIG. 2 is an assembled, isometric view of the portable electronic device shown in FIG. 1.

In assembly, referring to FIG. 2, the two rails 212 of the protective cover 20 are respectively inserted into the two guiding grooves 33. The covering plate 22 is positioned between the two side walls 321, and the rib 23 is received in the first opening 312. The protective cover 20 is slid along the guiding grooves 33. The housing 30 is then attached to the flange 12 of the main body 10, with the display 13 and the keypad 14 received in the receiving space 32 and respectively aligned with the first opening 312 and the second opening 314.

Figure 3:
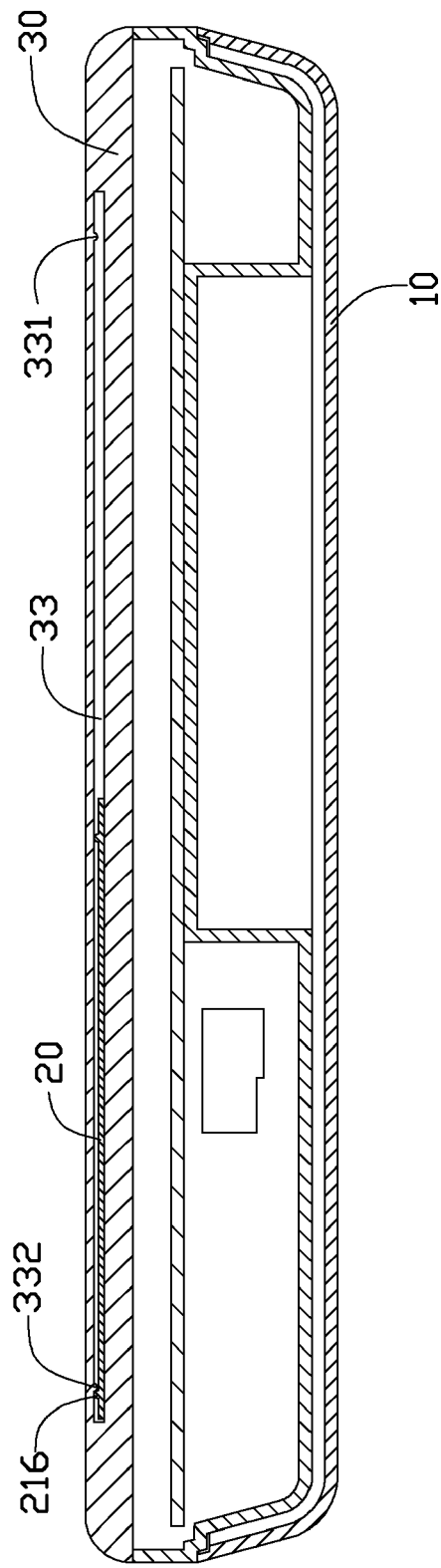
FIG. 3 is a cut-away section view along line III-III of FIG. 2.

Referring to FIG. 3, when the keypad 14 is not in use, the protective cover 20 is pushed toward the second opening 314 using the rib 23. The second protrusion 216 is pushed to pass the second projection 332. The rib 23 is then stopped by the bar 304. The end portion 214 is inserted into the slot 34, and the bar 304 is between the covering plate 22 and the rib 23. Since the second protrusion 216 is stopped by the second projection 332 and the rib 23 is stopped by the bar 304, the protective cover 20 cannot move without outside force. At this time, the covering plate is wholly received in the second opening 314 and seals the second opening 314 to protect against penetration by moisture and or dust.

Figure 4:
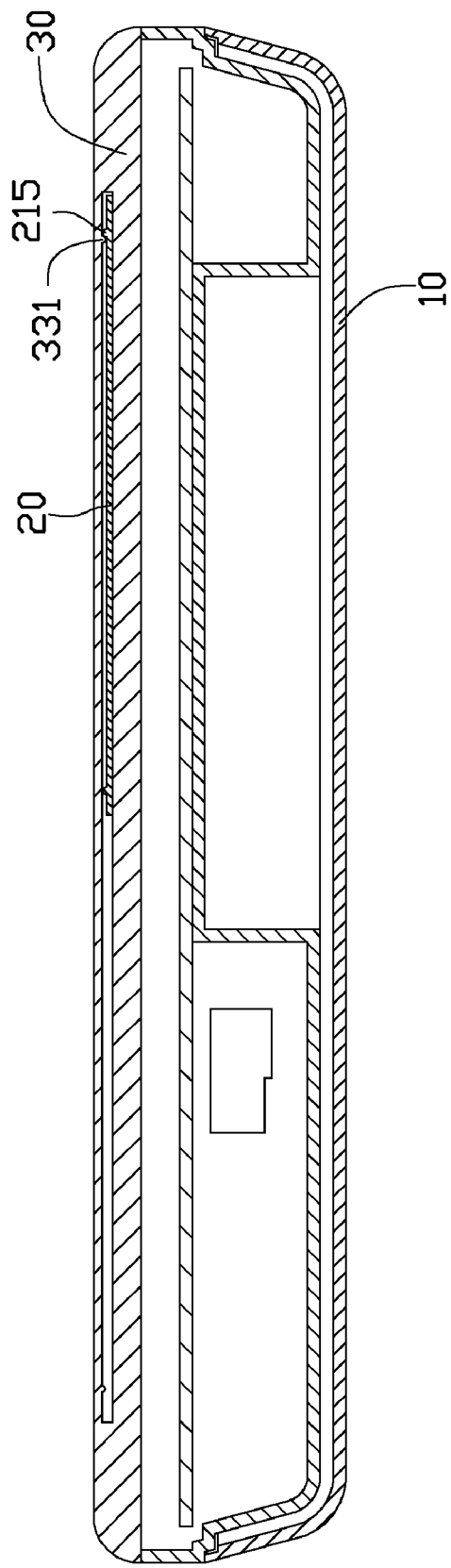
FIG. 4 is similar to FIG. 3, but showing the protective cover positioned at an open position.

Referring to FIG. 4, when the keypad 14 is in use, the protective cover 20 is pushed from the second opening 314 to the second opening 314 using the rib 23. The covering plate 22 and the first protrusion 215 are respectively pushed to pass the bar 304 and the first projection 331. When the covering plate 22 is wholly received in the first opening 312, the rib 23 resists the end wall 322 and the protective cover 20 cannot move without outside force. Since the protective cover 20 is transparent, the display 13 can be seen through the protective cover 20.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
a main body including a keypad;
a housing attached to the main body, the housing defining a receiving space and two guiding grooves, the keypad being received in the receiving space, the two guiding grooves being positioned at opposite sides of the receiving space and communicating with the receiving space; and
a protective cover including two rails, each rail being respectively engaged in one of the two guiding grooves, the protective cover being slidable in the receiving space along the guiding grooves to cover or expose the keypad.

2. The portable electronic device as claimed in claim 1, wherein the protective cover comprises a first protrusion and a second protrusion, the housing comprises a first projection and a second projection, the first protrusion is engaged with the first projection when the keypad is exposed, and the second protrusion is engaged with the second projection when the keypad is covered.

3. The portable electronic device as claimed in claim 2, wherein the housing defines the receiving space at one side and defines a first opening, a second opening at another side, a bar is formed between the first opening and the second opening, and the first opening and the second opening communicate with the receiving space.

4. The portable electronic device as claimed in claim 3, wherein the protective cover comprises a covering plate and a base plate, the size of the covering plate is similar to the size of the second opening.

5. The portable electronic device as claimed in claim 4, wherein the protective cover further comprises two opposite end portions, and a rib is formed on one of the end portions for sliding the protective cover along the guiding grooves.

6. The portable electronic device as claimed in claim 5, wherein the housing further defines a slot for receiving the other end portion.

7. The portable electronic device as claimed in claim 6, wherein the covering plate is placed to cover most of the base plate, leaving edges of the base plate exposed where the rails and the two end portions are formed at the edges thereof.

8. The portable electronic device as claimed in claim 7, wherein the protective cover is made of transparent material.

9. A portable electronic device comprising:
a main body including a housing, the main body defining a cavity and including a keypad in the cavity, the housing attached to the main body and covering the cavity, the housing defining a receiving space and two guiding grooves, the receiving space receiving the keypad, the guiding grooves being positioned at opposite sides of the receiving space and communicating with the receiving space; and
a protective cover including two rails, each rail being respectively engaged in one of the two guiding grooves, the protective cover being slidable in the receiving space along the guiding grooves to cover or expose the keypad.

10. The portable electronic device as claimed in claim 9, wherein the protective cover comprises a first protrusion and a second protrusion, the housing comprises a first projection and a second projection in each guiding groove, the first protrusion is engaged with the first projection when the keypad is exposed, and the second protrusion is engaged with the second projection when the keypad is covered.

11. The portable electronic device as claimed in claim 10, wherein the housing defines the receiving space at one side and defines a first opening, a second opening at another side, a bar is formed between the first opening and the second opening, and the first opening and the second opening communicate to the receiving space, the position of the second opening corresponds to that of the keypad.

12. The portable electronic device as claimed in claim 11, wherein the protective cover comprises a covering plate and a base plate, the size of the covering plate is similar to the size of the second opening.

13. The portable electronic device as claimed in claim 12, wherein the protective cover further comprises two opposite end portions, and a rib is formed on one of the end portions for sliding the protective cover along the guiding grooves.

14. The portable electronic device as claimed in claim 13, wherein the housing further defines a slot for receiving the other end portion.

15. The portable electronic device as claimed in claim 14, wherein the covering plate is placed to cover most of the base plate, leaving edges of the base plate exposed where the rails and the two end portions are formed at the edges thereof.

16. The portable electronic device as claimed in claim 15, wherein the protective cover is made of transparent material.

* * * * *